US010411873B1

(12) United States Patent
Schuh et al.

(10) Patent No.: US 10,411,873 B1
(45) Date of Patent: Sep. 10, 2019

(54) CLOCK DATA RECOVERY BROADCAST FOR MULTI-LANE SERDES

(71) Applicant: QUALCOMM Incorporated, San Diego, CA (US)

(72) Inventors: Brian Joel Schuh, Apex, NC (US); Michael Trombley, Cary, NC (US); Carrie Ellen Cox, Apex, NC (US); Robert Michael Bunce, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/917,883

(22) Filed: Mar. 12, 2018

(51) Int. Cl.
    *H04L 7/00* (2006.01)
(52) U.S. Cl.
    CPC .................................. *H04L 7/0087* (2013.01)
(58) Field of Classification Search
    CPC ................ H04L 7/0087; H04W 52/02; H04W 52/0225; H04W 52/0232
    USPC .................................................. 375/354, 355
    See application file for complete search history.

(56) References Cited

U.S. PATENT DOCUMENTS

| 7,860,400 | B2 | 12/2010 | Cole |
| 9,052,900 | B2 | 6/2015 | Zhang et al. |
| 9,184,909 | B1 | 11/2015 | McCracken et al. |
| 9,397,868 | B1* | 7/2016 | Hossain ............ H04L 25/03057 |
| 9,537,617 | B2* | 1/2017 | Chandrasekaran ... H04L 7/0079 |
| 9,768,947 | B2 | 9/2017 | Hossain et al. |
| 9,940,288 | B1* | 4/2018 | Reiss .................. G06F 13/4068 |
| 2010/0235663 | A1* | 9/2010 | Olsson .................... H04L 12/12 713/323 |
| 2015/0078495 | A1* | 3/2015 | Hossain .................. H04L 7/033 375/346 |

* cited by examiner

*Primary Examiner* — Siu M Lee
(74) *Attorney, Agent, or Firm* — Qualcomm Incorporated

(57) ABSTRACT

Clock data recovery broadcast for multi-lane SerDes is disclosed. In some implementations, a serial input/output (I/O) interface includes a master lane and a plurality of slave lanes to receive serial incoming data. The master lane has a master clock and data recovery (CDR) module to generate master data sample clock control signals. The master data sample clock control signals can be broadcasted to the slave lanes. Furthermore, each of the plurality of slave lanes having a slave CDR module. The slave CDR module can include a clock edge tracking module to generate local data sample clock control signals, and a multiplexer to select the master data sample clock control signals or local data sample clock control signals to apply in the respective slave lane in response to a signal from a CDR controller indicative of a low power mode.

12 Claims, 4 Drawing Sheets

CLOCK DATA RECOVERY BROADCAST FOR MULTI-LANE SERDES

FIELD OF DISCLOSURE

Aspects of the present disclosure relate generally to input/output (I/O) interface, and more particularly to clock data recovery broadcast for multi-lane SerDes (serializer/deserializer).

BACKGROUND

In many systems on a chip (SoCs) today, high speed serial links are used to communicably connect two chips, such as, application processor, modem processor, etc. A common type of high speed serial link used in SoCs is serializer/deserializer (SerDes). A SerDes interface typically provides a serializer on a transmitter side to serialize data from multiple parallel streams to allow transmission of the data serially over a transmission medium or wire. Conversely, on a receiver side, the SerDes interface typically provides a deserializer to deserialize the serial data received in multiple lanes in parallel so that the deserialized data can be forwarded to downstream circuitry for further processing in parallel. SerDes interface is a popular choice of chip-to-chip interface because SerDes interface can ease the competition for the limited number of input/output (I/O) ports on chips.

As mentioned above, incoming data at a conventional SerDes interface of a receiver involves multiple lanes in parallel. Each lane provides a clock data recovery (CDR) module to track and extract clock edges from the incoming data. The clock edge extracted can be used to sample the incoming data during deserialization of the incoming data within that lane. In other words, CDR in conventional SerDes interface is performed on a per-lane basis during normal operation.

However, one issue with the conventional SerDes interface is high power consumption, in particular, the power consumption in CDR. Significant resource is employed to extract the clock edge information from the incoming data in order to track differences that may exist between the transmitting clock domain and the receiving clock domain. Since each lane in a conventional SerDes interface performs its own CDR, the power consumption is multiplied by the number of lanes in the interface, for example, 16.

Accordingly, there is a need in the art to provide a CDR scheme in SerDes receiver interface that is more power efficient.

SUMMARY OF THE DISCLOSURE

The following presents a simplified summary of one or more implementations to provide a basic understanding of such embodiments. This summary is not an extensive overview of all contemplated implementations and is intended to neither identify key or critical elements of all implementations nor delineate the scope of any or all implementations. The sole purpose of this summary is to present some concepts of one or more implementations in a simplified form as a prelude to the more detailed description that is presented later.

In some implementations, a serial input/output (I/O) interface includes a master lane and a plurality of slave lanes to receive serial incoming data. The master lane has a master clock and data recovery (CDR) module to generate master data sample clock control signals. The master data sample clock control signals can be broadcasted to the slave lanes. Furthermore, each of the plurality of slave lanes having a slave CDR module. The slave CDR module can include a clock edge tracking module to generate local data sample clock control signals, and a multiplexer to select the master data sample clock control signals or local data sample clock control signals to apply in the respective slave lane in response to a signal from a CDR controller indicative of a low power mode.

In some implementations, the multiplexer selects the master data sample clock control signals when the signal indicates the low power mode is enabled. Further, the clock edge tracking module is configured to be powered down when the multiplexer selects the master data sample clock control signals.

In some implementations, the multiplexer selects the local data sample clock control signals when the signal indicates the low power mode is disabled. Further, the clock edge tracking module is configured to be powered on when the multiplexer selects the local data sample clock control signals.

In some implementations, an I/O interface includes a plurality of lanes to receive incoming data, each of the plurality of lanes being configurable to be a master lane or a slave lane, wherein each of the plurality of lanes comprises a clock data recovery (CDR) module having a clock edge tracking module, wherein the clock edge tracking module of a respective lane is powered down when the respective lane is configured to be the slave lane and the I/O interface is in a low power mode. The I/O interface can further include a CDR controller to configure each of the plurality of lanes to be the master lane at a regularly occurring time interval for substantially the same length of time.

In some implementations, when a respective one of the plurality of lanes is configured to be the master lane, the clock edge tracking module of the respective lane generates master data sample clock control signals to be broadcasted to remaining ones of the plurality of lanes.

In some implementations, the clock edge tracking module of each of the remaining ones of the plurality of lanes is powered up to generate local data sample clock control signals when the I/O interface exits the low power mode.

In some implementations, the CDR controller configures each of the plurality of lanes to be the master lane in a predetermined order.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

In some implementations of a serializer/deserializer (SerDes) receiver having a plurality of lanes, one of the plurality of lanes is configured as a master lane, while the remaining lanes are configured as slave lanes. The master lane includes a master clock data recovery (CDR) module to generate master data sample clock control signals, which can be used to sample incoming data for deserializing the data. The master data sample clock control signals are broadcasted, or in some implementations, made available substantially simultaneously, to the slave lanes. Likewise, each of the slave lanes includes a slave CDR module to generate local data sample clock control signals. Unlike the master lane, the slave lane's CDR module does not broadcast the local data sample clock control signals generated. When the SerDes receiver enters a low power mode (a.k.a. a power saving mode), the slave lanes can select and use the master data sample clock control signals to capture the clock signal in the incoming data stream in order to sample data therein, instead of using the local data sample clock control signals. Therefore, the slave lanes can power down, or turn off, the local clock edge tracking modules within the slave lanes to save power.

In some implementations, each lane in a SerDes receiver can take turn to be the master lane, while the remaining lanes are configured as slave lanes, for example, in a round-robin fashion. By taking turn to act as the master lane, the SerDes receiver can account for the aging of individual lanes over the lifetime of the SerDes receiver, thus enhancing the accuracy of the master data sample clock control signals. More details of some implementations of CDR broadcast in multi-lane SerDes receiver are discussed below with reference to the figures.

Figure 1:
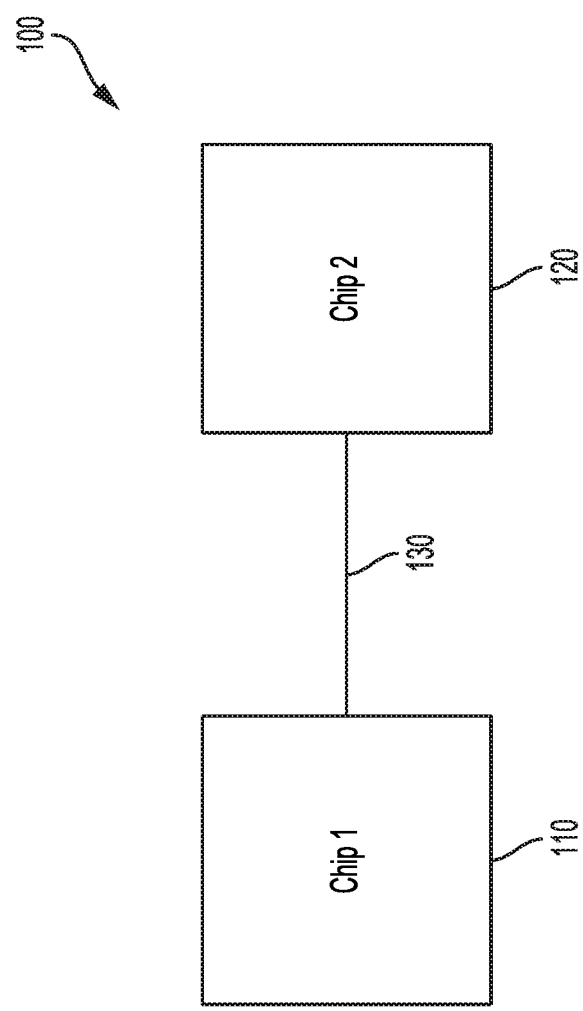
FIG. 1 is one implementation of a system having a chip-to-chip serial interface.

FIG. 1 is one implementation of a system having a chip-to-chip serial interface. The system 100 includes at least two chips, namely, chip 110 and chip 120, which in this case may be any appropriate semiconductor chip or chip package. In one example, chip 110 and chip 120 are both multi-core server processor chips that are each mounted in respective sockets, and those sockets are mounted on a printed circuit board or other appropriate substrate. Link 130 is a physical link has a plurality of conductive lines made of a conductive material, such as copper, formed in traces, wires, or on the board.

Further continuing with this example, link 130 not only provides a chip-to-chip interface, but each of the conductive lines within link 130 provides a high-speed serial link between a transmitter at chip 110 and a receiver at chip 120. As explained in more detail below, the transmitter at chip 110 may serialize data and send the serialized data over one of the conductive lines, where the serialized data is received at chip 120 and de-serialized accordingly. As such, link 130 can be referred to as a SerDes link. In some implementations, both chips 110 and 120 are provided with a common clock source (not shown). Alternatively, chip 110 and chip 120 are provided with separate clock sources.

The scope of disclosure is not limited to any particular type of chip. For instance, the principles described herein may be applied to systems on chip (SoCs), memory chips, and the like. Additionally, the scope of disclosure is not limited to any particular type of physical mounting, as any appropriate physical mounting may be used. Moreover, the principles described herein are not necessarily limited to chip-to-chip links, as they can be applied to any clock data recovery (CDR) SerDes architecture where an incoming data phase is detected in the receiver.

Figure 2:
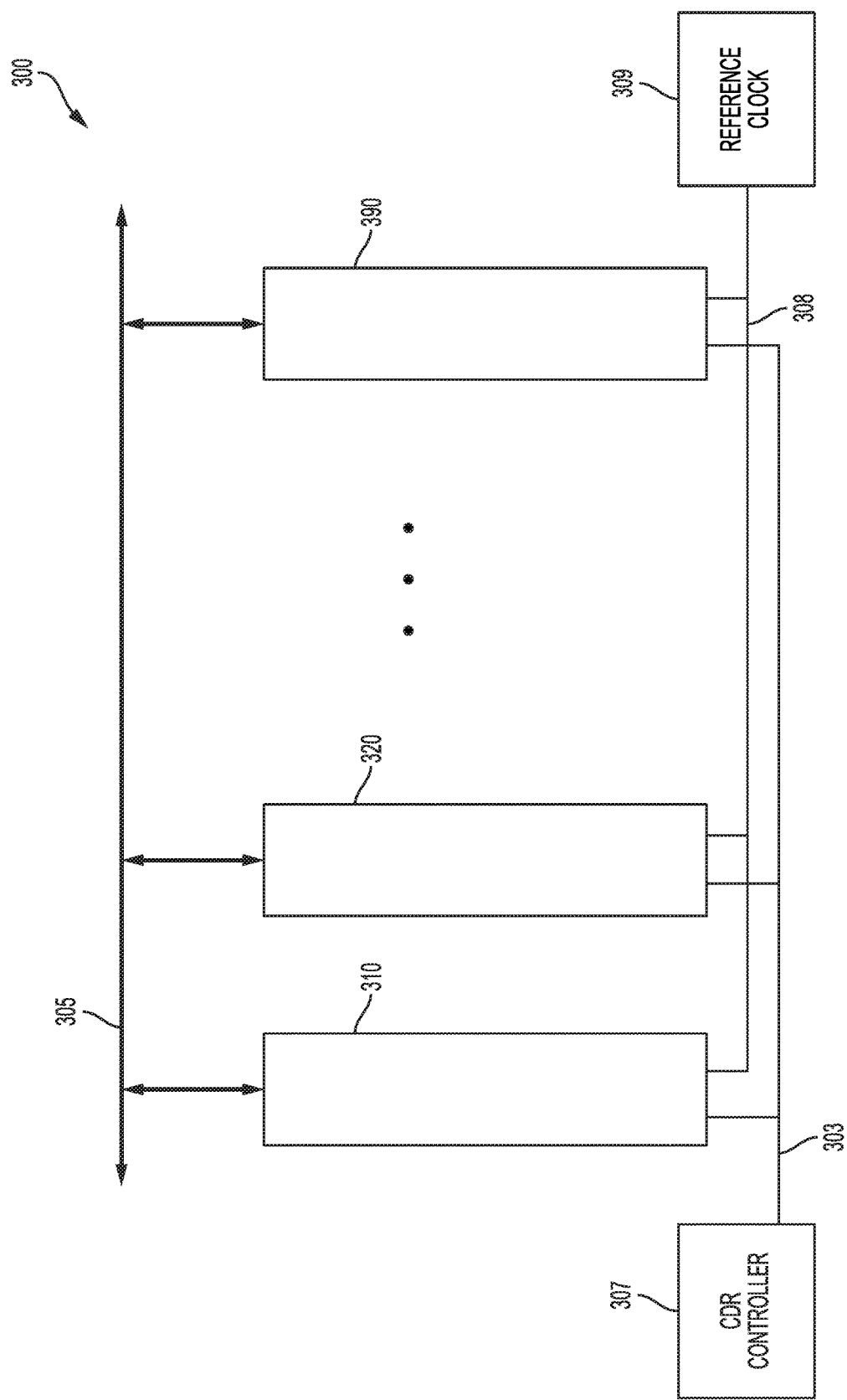
FIG. 2 is one implementation of a multi-lane SerDes receiver interface.

FIG. 2 is one implementation of a multi-lane SerDes receiver interface. The interface 300 includes multiple lanes 310-390 (e.g., 8 lanes, 16 lanes, etc.). Each of lanes 310-390 can be substantially the same. One implementation of one of lanes 310-390 is described in detail below with reference to FIG. 3. The lanes 310-390 are communicably coupled to each other via connection 305. Each of lanes 310-390 can receive and/or transmit data via connection 305. In addition, lanes 310-390 can broadcast and/or receive master data sample clock control signals among themselves via connection 305. More details of master data sample clock control signals are discussed below with reference to FIG. 3. The interface 300 further includes a clock data recovery (CDR) controller 307 coupled to each of lanes 310-390 via connection 303. In addition, the interface 300 includes a reference clock 309 coupled to each of lanes 310-390 to provide a common clock signal to each of lanes 310-390 via connection 308. As such, the jitter, which each of lanes 310-390 sees, would be common to all lanes 310-390.

In some implementations, CDR controller 307 includes hardware (e.g., logic gates, finite state machines, etc.) and/or software logic to configure each of lanes 310-390 as a master lane or a slave lane. Furthermore, CDR controller 307 can determine when the receive enters or exits a low power mode and to take appropriate action. For instance, CDR controller 307 can send signals indicating when lanes 310-390 should enter or exit the low power mode.

In some implementations, each one of the lanes 310-390 is configurable to be a master lane or a slave lane. When a particular lane is configured to be a master lane, the remaining lanes can be configured as slave lanes. For example, when lane 310 is configured as a master lane, lanes 320-390 are configured as slave lanes. In some implementations, CDR controller 307 may send one or more control signals to lanes 310-390 to configure each of them as a master lane or a slave lane.

In some implementations, each of lanes 310-390 can take turn to be the master lane. For instance, each of lanes 310-390 can be designated as a master lane at a regularly occurring time interval for substantially the same length of time (e.g., a lane can be a master lane for 1 minute once every 16 minutes). In other words, the master lane can be periodically rotated through lanes 310-390 in a round-robin manner. For example, lane 310 can be configured as the master lane first, followed by lane 320, and so forth. This can allow each lane to have its calibration refreshed (when the lane is configured as the master lane) to counter the effects of aging or other environmental effects. Furthermore, the time during which a lane is configured as a master lane can be substantially the same for all lanes 310-390 throughout the lifetime of the interface 300. As such, each lane may be used in similar fashion for substantially the same amount of time so that the aging effect (or wear and tear) on each of the lanes 310-390 may be similar to each other.

In some alternate implementations, more than one of lanes 310-390 can be configured as master lanes. For example, lanes 310-390 may be divided into multiple groups (e.g., 2 groups, 4 groups, etc.), each group having its own master lane. Lanes not configured as the master lanes are configured as slave lanes. The slave lanes of each group can receive control signals from their respective master lane within each group. In some implementations, lanes close to each other physically are assigned into the same group.

Figure 3:
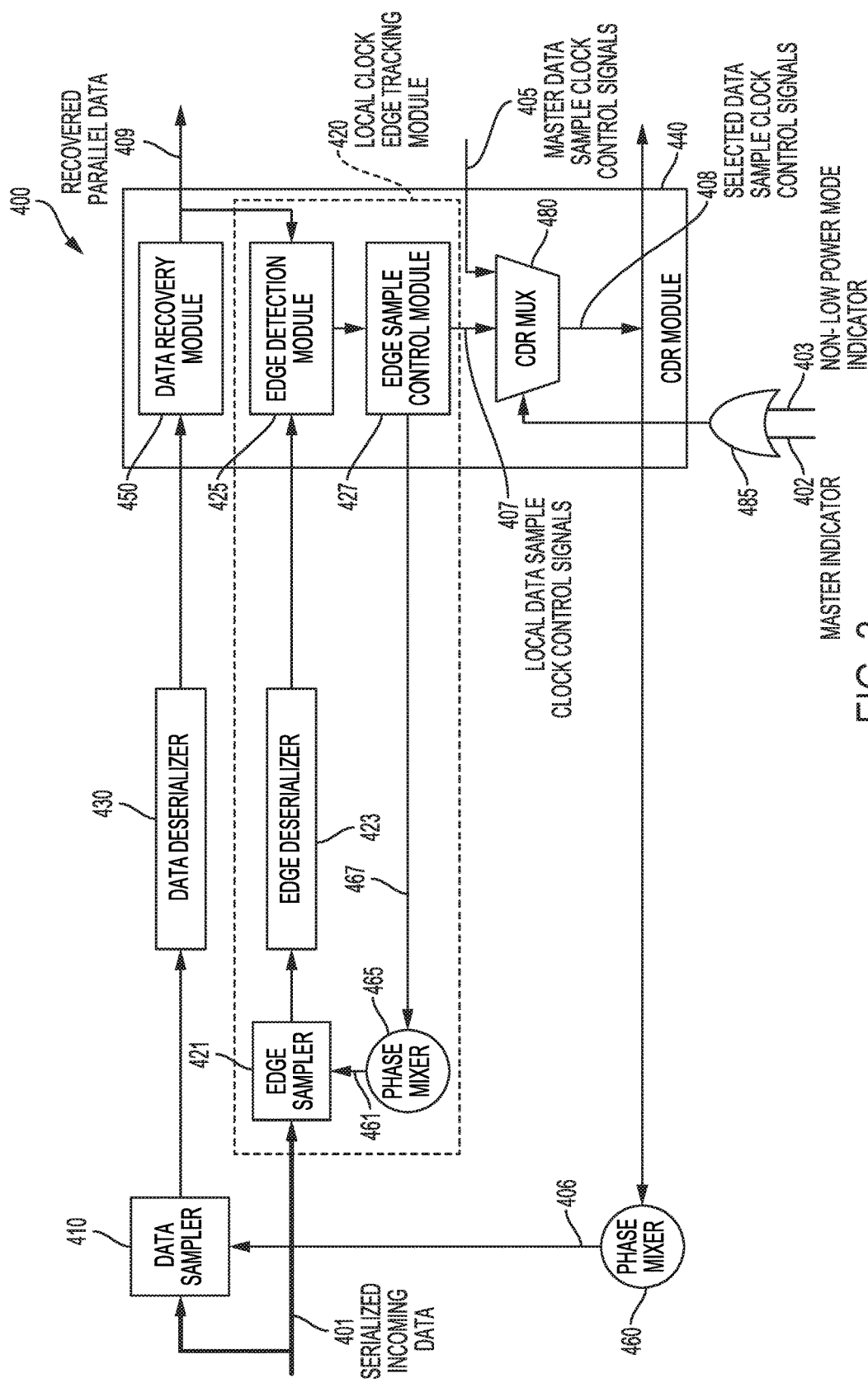
FIG. 3 is one implementation of a lane within the multi-lane SerDes receiver interface of FIG. 2.

FIG. 3 is one implementation of one of the lanes 310-390 within the multi-lane SerDes interface 300 of FIG. 2. The lane 400 includes a data sampler 410, a local clock edge tracking module 420, a data deserializer 430, a phase mixer 460, and a clock data recovery (CDR) module 440. The CDR module 440 can further include a data recovery module 450 and a clock data recovery (CDR) multiplexer (MUX) 480. In some implementations, the local clock edge tracking module 420 includes an edge sampler 421, an edge deserializer 423, an edge detection module 425, an edge sample control module 427, and a phase mixer 465. In some implementations, portion of the local clock edge tracking module 420 can be incorporated into CDR module 440. For instance, as shown in FIG. 3, edge detection module 425 and edge sample control module 427 of local clock edge tracking module 420 are incorporated into CDR module 440.

During operation, serialized incoming data 401 is input to data sampler 410 and edge sampler 421. Data sampler 410 further receives a phase signal 406 from phase mixer 460. Data sampler 410 samples the serialized incoming data 401 using phase signal 406 and outputs the sampled data to data deserializer 430. Data deserializer 430 deserializes the sampled data from data sampler 410 and then outputs the deserialized data to data recovery module 450. Data recovery module 450 recovers the data from deserialized data to output recovered parallel data. The recovered parallel data 409 is forwarded to downstream circuits (not shown), e.g., parallel data interface. Furthermore, the recovered parallel data 409 is also provided to edge detection module 425.

Like data sampler 410, edge sampler 421 receives a phase signal 461 from phase mixer 465, in addition to the serialized incoming data 401. Edge sampler 421 samples the serialized incoming data 401 using phase signal 461 to sample clock edges in the serialized incoming data 401. Edge sampler 421 outputs the clock edges sampled to edge deserializer 423. Edge deserializer 423 deserializes the clock edges and outputs the deserialized clock edges to edge detection module 425. Edge detection module 425 uses the recovered parallel data 409 and the deserialized clock edges to extract clock edges, which are then output to edge sample control module 427. Using the extracted clock edges, edge sample control module 427 generates local data sample clock control signals 407. Edge sample control module 427 also generates phase information 467 on the extracted edges and outputs the phase information 467 to phase mixer 465. Phase mixer 465 uses phase information 467 to generate phase signal 461 for edge sampler 421.

In some implementations, if lane 400 is configured to be a slave lane, then lane 400 can further carry out the following operations. Edge sample control module 427 provides local data sample clock control signals 407 to CDR MUX 480. CDR MUX 480 also receives master data sample clock control signals 405 and an output of OR gate 485. OR gate 485 receives a master indicator 402 and a non-low power mode indicator 403, which can be provided by upper level logic of the receiver (e.g., CDR controller 307 in FIG. 2). Since lane 400 is configured as a slave lane, master indicator 402 is at logical low. Hence, the output of OR gate 485 depends on the logic value of non-low power mode indicator 403. If non-low power mode indicator 403 is at logical high, indicating that the receiver is not in a low power mode, then the output of OR gate 485 is at logical high too, causing CDR MUX 480 to select local data sample clock control signals 407. Otherwise, if non-low power mode indicator 403 is at logical low, indicating that the receiver is in the low power mode, then the output of OR gate 485 is at logical low, causing CDR MUX 480 to select master data sample clock control signals 405. CDR MUX 480 outputs the selected data sample clock control signals 408, which can be forwarded to phase mixer 460 for generating the phase signal 461 and to downstream circuitry (not shown) of the receiver.

In some implementations, if lane 400 is configured to be a master lane, then lane 400 can further perform the following operations. Edge sample control module 427 provides local data sample clock control signals 407 to CDR MUX 480. As mentioned above, OR gate 485 receives master indicator 402 and non-low power mode indicator 403. Since lane 400 is configured as a master lane, master indicator 402 is at logical high. Hence, the output of OR gate 485 is at logical high regardless of the value of non-low power mode indicator 403. In response to the output of OR gate 485 at logical high, CDR MUX 480 selects local data sample clock control signals 407. In sum, when lane 400 is configured as a master lane, CDR MUX 480 will always select local data sample clock control signals 407, regardless of whether receiver is in low power mode. CDR MUX 480 can forward the selected data sample clock control signals 408 to phase mixer 460 for generating the phase signal 461 and to downstream circuitry (not shown) of the receiver. Furthermore, since lane 400 is configured as the master lane, the selected data sample clock control signals 408 (a.k.a. the master data sample clock control signals) can be broadcasted to slave lanes, which can use the broadcasted data sample clock control signals to sample or extract data in the slave lanes. For instance, the selected data sample clock control signals 408 can be broadcasted to slave lanes via connection 305 shown in FIG. 2.

To save power, the local clock edge tracking module 420 can be powered down when lane 400 does not use local data sample clock control signals 407. Specifically, if CDR MUX 480 selects local data sample clock control signals 407, then the clock edge tracking module 420 remains powered on. On the other hand, if CDR MUX 480 selects master data sample clock control signals 405, then the clock edge tracking module 420 can be powered down to save power. As mentioned above, the receiver has multiple slave lanes, and hence, multiple clock edge tracking modules similar to clock edge tracking module 420. In some implementations, there are fifteen (15) slave lanes. When all the slave lanes' clock edge tracking modules are powered down, significant power can be saved. This will be particularly advantageous when the receiver is in low power mode under circumstances where power conservation is critical.

Figure 4:
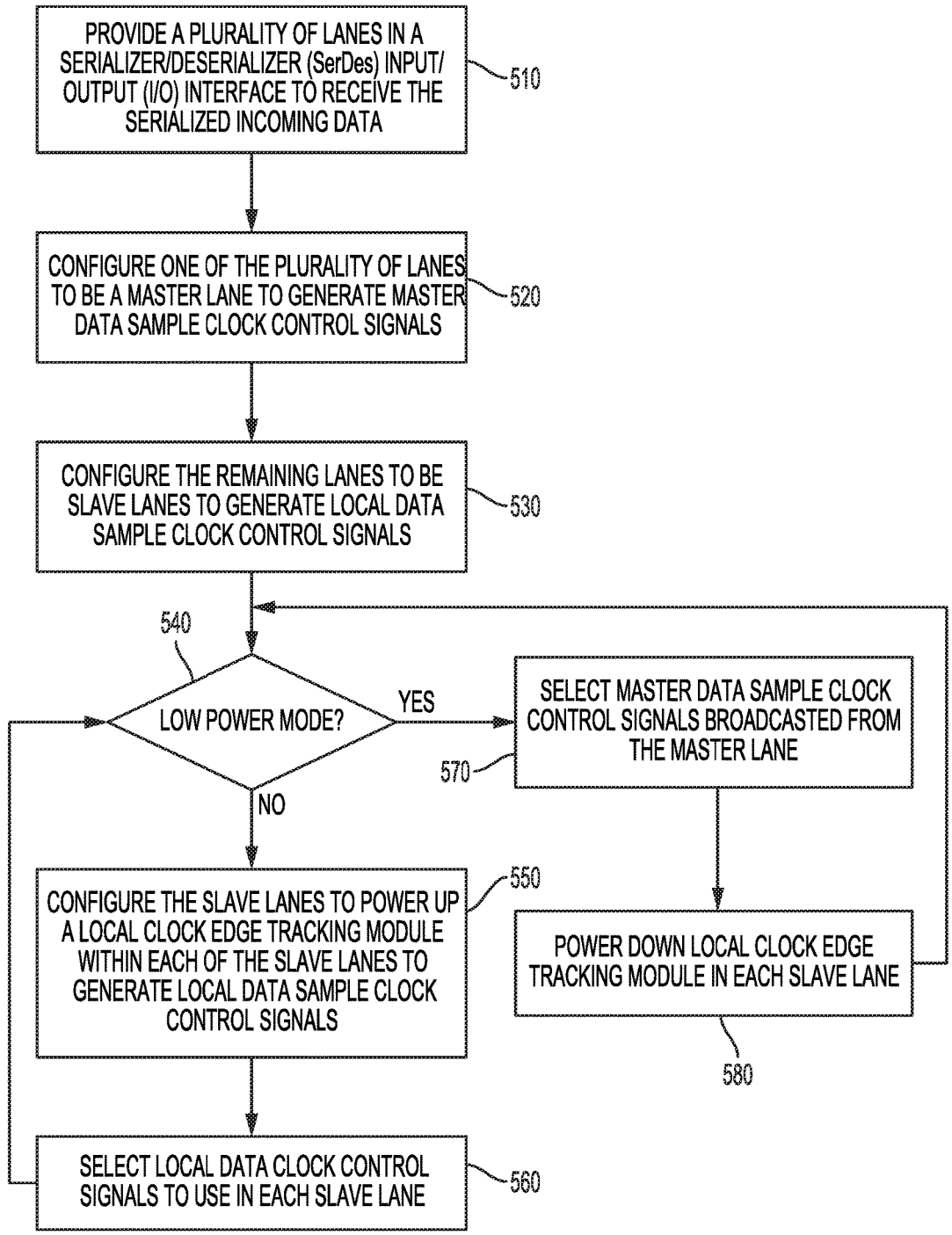
FIG. 4 is a flow diagram of one implementation of a method to perform clock data recovery broadcast in a multi-lane SerDes interface.

FIG. 4 is a flow diagram of one implementation of a method to perform clock data recovery broadcast in a multi-lane serial interface. The method can be performed using hardware, such as the modules described above with reference to FIG. 1-3, firmware, software, or a combination of any of the above.

In some implementations, the method begins with providing a plurality of lanes in a SerDes I/O interface to receive serialized incoming data (block 510). Then the method configures one of the plurality of lanes to be a master lane to generate master data sample clock control signals (block 520). The method further configures the remaining lanes to be slave lanes to generate local data sample clock control signals within each slave lane (block 530).

At block 540, the method determines if the receiver is not in a low power mode. If the receiver is in a low power mode, the method transitions to block 550. In some implementations, the method configures the slave lanes to power up a local clock edge tracking module within each of the slave lanes to generate local data sample clock control signals (block 550). Then the method can select local data clock control signals to use in each slave lane (block 560), for example, to generate local clock signal, to extract or sample data, etc. Then the method can return to block 540 to monitor if the receiver enters or exits the low power mode.

If it is determined that the receiver is in the low power mode at block 540, then the method transitions to block 570. In some implementations, the method selects master data sample clock control signals broadcasted from the master lane (block 570). Furthermore, the method can power down local clock edge tracking module in each slave lane (block 580). Powering down local clock edge tracking modules in slave lanes can save significant power in the receiver. Then the method can return to block 540 to monitor if the receiver enters or exits the low power mode.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An input/output (I/O) interface, comprising:
   a master lane to receive serial data, the master lane including a master clock and data recovery (CDR) module to generate master data sample clock control signals; and
   a plurality of slave lanes to receive the serial data, each of the plurality of slave lanes having a slave CDR module, the slave CDR module in a respective slave lane comprising:
   a clock edge tracking module to generate local data sample clock control signals; and
   a multiplexer to select the master data sample clock control signals or local data sample clock control signals to apply in the respective slave lane in response to a signal from a CDR controller indicative of a low power mode.

2. The I/O interface of claim 1, wherein the multiplexer of each of the plurality of slave lanes selects the master data sample clock control signals when the signal indicates the low power mode is enabled.

3. The I/O interface of claim 2, wherein the clock edge tracking module is configured to be powered down when the multiplexer selects the master data sample clock control signals.

4. The I/O interface of claim 1, wherein the multiplexer selects the local data sample clock control signals when the signal indicates the low power mode is disabled.

5. The I/O interface of claim 4, wherein the clock edge tracking module is configured to be powered on when the multiplexer selects the local data sample clock control signals.

6. The I/O interface of claim 1, wherein the master data sample clock control signals are broadcasted to the plurality of slave lanes.

7. An input/output (I/O) interface, comprising:
   a plurality of lanes to receive data, each of the plurality of lanes being configurable to be a master lane or a slave lane, wherein each of the plurality of lanes comprises a clock data recovery (CDR) module having a clock edge tracking module, wherein the clock edge tracking module of a respective lane is powered down when the respective lane is configured to be the slave lane and the I/O interface is in a low power mode; and
   a CDR controller to configure each of the plurality of lanes to be the master lane at a regularly occurring time interval for substantially the same length of time.

8. The I/O interface of claim 7, wherein, when a respective one of the plurality of lanes is configured to be the master lane, the clock edge tracking module of the respective lane generates master data sample clock control signals to be broadcasted to remaining ones of the plurality of lanes.

9. The I/O interface of claim 8, wherein the clock edge tracking module of each of the remaining ones of the plurality of lanes is powered up to generate local data sample clock control signals when the I/O interface exits the low power mode.

10. The I/O interface of claim 7, wherein the CDR controller configures each of the plurality of lanes to be the master lane in a predetermined order.

11. A method to receive serial data, comprising:
    providing a plurality of lanes in a serializer/deserializer (SerDes) input/output (I/O) interface to receive the serial data;
    configuring one of the plurality of lanes to be a master lane to generate master data sample clock control signals; and
    configuring remaining ones of the plurality of lanes to be slave lanes, wherein the slave lanes are further configured to use the master data sample clock control signals to recover clock and data in a low power mode, wherein each of the plurality of lanes is periodically configured to be the master lane for substantially the same length of time.

12. The method of claim 11, further comprising:
    configuring the slave lanes to power up a clock and data recovery (CDR) module within each of the slave lanes to generate local data sample clock control signals when the SerDes interface exits the low power mode.

* * * * *